United States Patent [19]
Wanner

[11] Patent Number: 5,812,648
[45] Date of Patent: Sep. 22, 1998

[54] TELEPHONE RINGER CONTROL DEVICE

[75] Inventor: Brenda D. Wanner, Meridian, Id.

[73] Assignee: Micron Technology, Inc., Boise, Id.

[21] Appl. No.: 603,474

[22] Filed: Feb. 20, 1996

[51] Int. Cl.[6] ............................ H04M 1/56; H04M 15/08; H04M 3/00; H04M 1/66
[52] U.S. Cl. .......................... 379/142; 379/190; 379/199; 379/421
[58] Field of Search ................................. 379/93, 95, 96, 379/102, 105, 111, 133, 140, 142, 188, 190, 199, 200, 418, 421

[56] References Cited

U.S. PATENT DOCUMENTS

| | | | |
|---|---|---|---|
| 4,405,839 | 9/1983 | Groff | 379/199 |
| 4,893,329 | 1/1990 | O'Brien | 379/199 |
| 5,265,145 | 11/1993 | Lim | 379/199 |
| 5,317,632 | 5/1994 | Ellison | 379/199 |
| 5,546,448 | 8/1996 | Caswell et al. | 379/142 |
| 5,604,797 | 2/1997 | Adcock | 379/199 |

*Primary Examiner*—Paul Loomis
*Attorney, Agent, or Firm*—Seed and Berry LLP

[57] ABSTRACT

A telephone ringer control device selectively activates or deactivates a telephone ringer to silence a telephone during specified periods. The silent periods may be specified by a timer. In one embodiment, the ringer control device includes a remotely accessible activation circuit that allows the ringer control device to be programmed or overridden via a telephone line. In another embodiment, the ringer control device includes a caller identification to allow the user to block out all calls except for those originating from specified callers. The ringer control device may be mounted within the telephone housing, may be a stand-alone item, or may be incorporated in a telephone answering machine.

7 Claims, 1 Drawing Sheet

TELEPHONE RINGER CONTROL DEVICE

TECHNICAL FIELD

The present invention relates to telephones and, more particularly, to methods and structures for controlling ringers in telephones.

BACKGROUND OF THE INVENTION

Common telephones include a variety of signaling devices or "ringers" to indicate an incoming call. In most telephones, the ringer is a bell or other noise-producing device that provides an audible signal to a user that a call is incoming.

Because it is sometimes desirable to silence the telephone, many telephones include ON/OFF switches to disable their ringers. Additionally, many telephones include volume controls that allow a user to adjust the volume of the ringer.

In some situations, ON/OFF switches and ringer volume controls cause difficulties for telephone users. For example, night shift workers who attempt to sleep during the day are often subjected to sleep-interrupting telephone calls. Many of these calls are unsolicited interruptions, such as common telemarketing solicitations.

With conventional phones, the user can prevent such interruptions by turning the telephone ringer off. However, by turning the ringer off, the telephone user blocks all calls, not just undesired calls. Consequently, the user risks missing important calls. For example, the telephone user does not receive emergency calls or wake up calls. Furthermore, the user may forget to turn the ringer back on, thus missing desired calls. Conversely, the user may forget to turn the ringer off before going to bed, thus being awakened by at least one call. Consequently, the telephone owner is often faced with the choice of missing desired calls or having interrupted sleep.

SUMMARY OF THE INVENTION

A telephone ringer controller according to the invention includes a ringer disable circuit that disables the telephone ringer in response to user selected inputs. In the preferred embodiment of the invention, the ringer controller includes a timer and a ringer disable circuit coupled between the timer and the ringer. The user sets the timer through an input interface such that the timer activates the ringer disable circuit during selected periods. When the ringer disable circuit is active, it disables the ringer and the telephone remains silent. At other times, the ringer disable circuit is inactive and the ringer rings normally in response to incoming calls.

The preferred embodiment also includes a control circuit coupled to the timer and couplable to the telephone line through a remotely accessible activation circuit. The activation circuit accepts signals from the telephone line and provides corresponding programming signals to the control circuit. The control circuit controls the disable circuit directly and indirectly through a direct line and through the timer, respectively. The control circuit can therefore allow the timer to establish the active and inactive periods. The control circuit can also allow a caller to input an override code to override the timer so that emergency calls can activate the ringer, even during periods when the timer would otherwise deactivate the ringer.

In one embodiment, the ringer controller includes a caller identification circuit that identifies the phone number of the incoming caller and compares the phone number to a list of acceptable telephone numbers. If the incoming caller's phone number matches a number on the list, the ringer control device activates the ringer. This embodiment allows the user to program selected callers who can automatically override the ringer disable circuit.

In the preferred embodiment, the ringer controller is incorporated within a telephone. However, in alternative embodiments, the ringer controller can be an external device or may be incorporated within a telephone answering machine. Control, activation, timing and other aspects of the ringer controller may be implemented in software or hardware.

Also, in the preferred embodiment, the input interface is the telephone keypad. However, alternatively, the input interface can be a separate user-controlled panel, voice activated interface, or part of a computer telephony device.

DETAILED DESCRIPTION OF THE INVENTION

Figure 1:
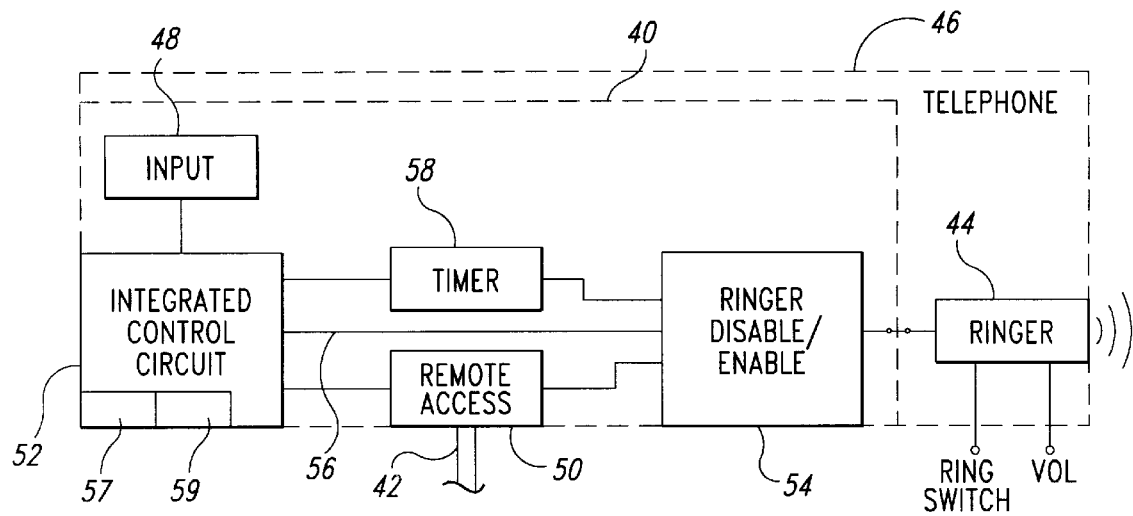
FIG. 1 is a block diagram of a ringer controller according to the invention including a timer, a remotely accessible activation circuit and a control circuit.

As shown in FIG. 1, a ringer controller 40 is coupled between a telephone line 42 and a ringer 44. The ringer controller 40 and ringer 44 are preferably housed within the telephone 46, as represented by the broken lines. However, the ringer controller 40 can also be housed separately, or within another device such as an answering machine or computer telephony device.

The ringer controller 40 controls, activates, and deactivates the ringer 44 in response to input signals from either or both of the telephone line 42 or an input interface 48 under control of an integrated control circuit 52. The control circuit 52 can be a microprocessor, programmable logic array or any other acceptable device. The input interface 48 is preferably the keypad of the telephone 46, and it allows the user to enter commands by pressing appropriate keys on the keypad. Keypad-based user inputs are known, being found for example in U.S. Pat. No. 5,471,524 to Colvin et al.

While the input interface 48 is preferably the telephone keypad, any other appropriate form of input interface may be within the scope of the invention. For example, telephone answering machines often employ separate push buttons for programming options. Similarly, where the telephone 46 is part of a computer telephony device, the computer circuitry and keyboard can function as the input interface 48. A variety of other interfaces will also be apparent to one of skill in the art, including voice recognition devices, manual switches, or any other form of user input.

As a complement to, or in place of, the input interface 48, the ringer controller 40 includes a remotely accessible activation circuit 50 that accepts input signals from the telephone line. The activation circuit 50 forms an interface between the telephone line 42 and the control circuit 52 to convert signals from the telephone line 42 to the appropriate format for input to the control circuit 52. For example, the activation circuit may include a DTMF decoder for converting remotely generated pulse tones to the appropriate signal format for the control circuit 52. Additionally, as will be discussed in greater detail below, the activation circuit 50 also includes a memory 59 containing override codes to allow callers to override the control circuit programming.

The control circuit 52 controls operation of the ringer controller 40 in response to user inputs at the input interface 48 and the telephone line 42 by controlling a ringer disable circuit 54 along one of two paths. First, the control circuit 52 controls the disable circuit 54 along a direct line 56. This allows the control circuit to immediately activate or deactivate the disable circuit 54. Second, the control circuit 52 controls a timer 58 coupled to the disable circuit 54. The timer 58 is a conventional programmable, clock-based timer activated by the control circuit 52. When activated, the timer 58 outputs a ringer enable signal during programmed enable periods and outputs a ringer disable signal at other times. The ringer enable/disable signals drive the disable circuit 54 indicating that the ringer 44 should be active during enable periods and silent during other periods.

The disable circuit 54 receives the ringer enable/disable signal from the timer 58 and the direct signal from the control circuit 52. If either the ringer enable/disable signal or the direct signal from the control circuit 52 corresponds to an active ringer, the disable circuit 54 activates the ringer 44. When the ringer 44 is active, the ringer 44 produces an audible signal in response to incoming calls on the telephone line 42. If both the ringer enable/disable signal and the direct signal correspond to an inactive ringer, the disable circuit 54 deactivates the ringer 44. When the ringer 44 is inactive, the ringer 44 remains silent in response to incoming calls.

The user operates the ringer controller 40 by inputting commands through the input interface 48. The user first selects the operating mode by selecting whether the timer 58, the activation circuit 50, or both will control the disable circuit 54. If the timer 58 is to control the disable circuit 54, the user programs the active and inactive periods for the ringer 44. For example, the user may program a selected sleep period.

If the activation circuit 50 controls the ringer 44, the user sets the timer 58 to produce the ringer disable signal. The user then inputs selected options into the control circuit 52. For example, the user can allow a caller to supply a override code to activate the ringer 44 remotely. When the caller inputs a code, a comparator 57 within the activation circuit 56 compares the input code to the override code or codes stored in the memory 59. If the input code matches the stored code, the caller can activate the ringer 44. The user can therefore allow callers to override the ringer controller 40 by providing the selected override code to the callers. This feature would enable, for instance, a child's school to reach a parent in an emergency.

Also, the user may program the control circuit 52 to allow a caller to program the timer 58. To do so, the caller provides the override code and then inputs commands to the control circuit 52 using, for example, the telephone keypad to set the active and inactive periods for the timer 58.

Figure 2:
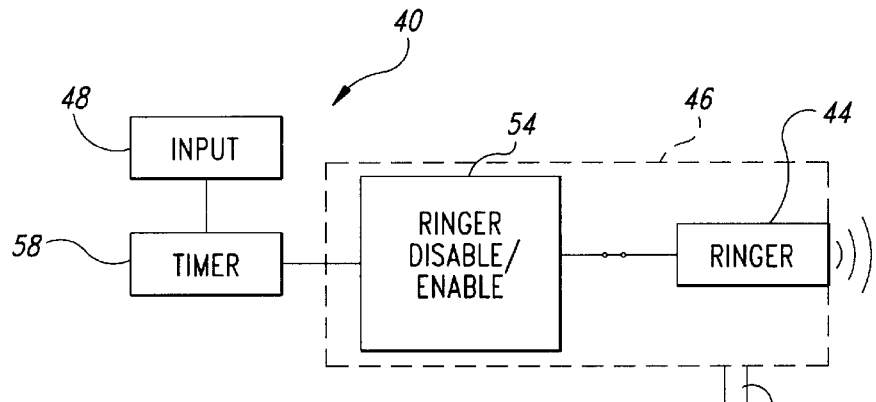
FIG. 2 is a block diagram of an alternative embodiment of the invention with the remotely accessible activation circuit and control circuit removed.

FIG. 2 shows an alternative embodiment of the invention with no remote access and with the control circuit 52 removed. In this embodiment, the input interface 48 directly controls the timer 58 to activate and program the timer 58. The structure of the ringer controller 40 of FIG. 2 is significantly simplified as compared to the above-described embodiment. Thus, the ringer controller 40 of FIG. 2 may be more easily adapted for use in an alarm clock.

Because the control circuit 52 and the activation circuit 50 are eliminated, the telephone line 42 couples directly to the telephone 46. Also, the ringer disable circuit 54 has only a single input that receives the enable/disable signal from the timer 58. As above, the disable circuit 54 deactivates the ringer 44 during programmed intervals in response to the timer's enable/disable signal.

Figure 3:
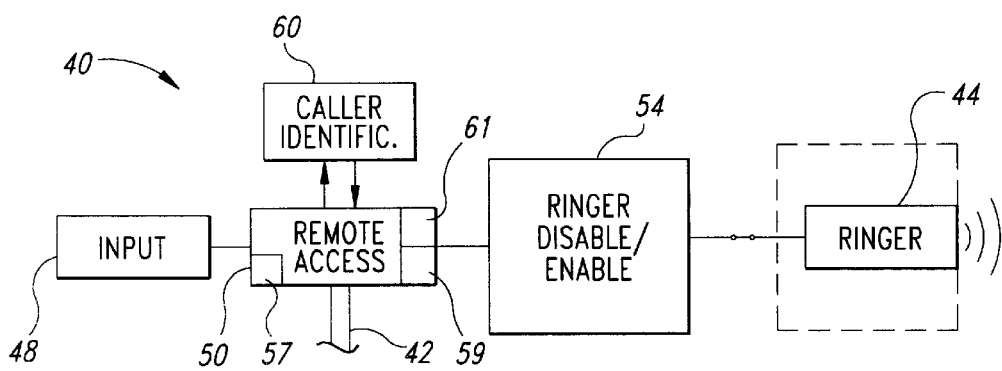
FIG. 3 is a block diagram of an alternative embodiment of the invention with the timer removed.

FIG. 3 presents a second alternative embodiment where the timer 58 and control circuit 52 are removed such that the disable circuit 54 is controlled directly by the activation circuit 50 in response to signals on the telephone line 42. Additionally, this embodiment includes a caller identification circuit 60. The caller identification circuit 60 identifies the originating source of the telephone call and indicates to the activation circuit 50 the identity of the caller. The activation circuit 50 then compares the caller's telephone number to an acceptable phone number list stored in a number memory 61. If the caller's telephone number matches an allowable number, the activation circuit 50 provides an enable signal to the disable circuit 54 to enable the ringer. Because the user inputs phone numbers in the number memory 61 through the input interface 48, the user can designate permissible originating numbers. The user can thus block out all calls except calls originating from designated sources.

The activation circuit 50, like that of the embodiment of FIG. 1, can also be programmed to respond to tones from the telephone line 42. As before, a caller can thus override the ringer controller 40 by entering the specified override code through a keypad of the remote telephone.

The user selects one or both of caller ID mode and remote override mode through the input interface 48. If the user selects normal mode, the ringer 44 is disabled unless a caller inputs an override code matching the code stored in the memory 59. If the user selects caller ID mode, the comparator 57 compares the originating phone number, as identified by the caller identification circuit 60, to numbers stored in the number memory 61. If the comparator 57 indicates a match, the ringer 44 rings. If the comparator 57 indicates no match, the ringer 44 is silent.

While various embodiments have been described in this application for illustrative purposes, the claims are not so limited. Various methods or apparatuses operating according to the principles of the invention may fall within the scope of the invention. For example, while the exemplary ringer controller 40 is carried within a telephone housing 46, the ringer controller 40 can be positioned outside of the telephone body. The ringer controller 40 can thus be a stand-alone item, or may be incorporated within a telephone answering machine or computer system. Similarly, while the input interface 48 has been described as a telephone keypad, other sources of override signals can be within the scope of the invention. For example, the override code may be produced within a computer or may rely upon other methods of identification, such as recognition of spoken codes. Also, the various components, such as the timer and caller identification circuit, may be implemented as software or hardware or a combination of software and hardware. Accordingly, the invention is not limited except as by the appended claims.

I claim:

1. A ringer control device for controlling a ringer in a telephone, comprising:

a ringer disable circuit having a disable input and couplable to the ringer, the disable circuit being responsive to disable the ringer in response to a disable signal at the disable input;

a disable signal circuit coupled to supply the disable signal to the disable input, the disable signal circuit including a timer and a remotely accessible activation circuit couplable to a telephone line, the activation circuit being responsive to re-enable the ringer in response to selected commands from the telephone line, the activation circuit including;
- a memory contained stored data representing the selected commands;
- a decoder coupled to decode signals from the telephone line; and
- a comparator coupled to retrieve the data from the memory and to receive decoded signals from the decoder, the comparator comparing the selected commands to the decoded signal, the comparator producing the disable signal in response to the decoded signal matching the selected commands; and a circuit further including a caller identification circuit coupled to the decoder, the caller identification circuit producing a signal representing an origination source of a telephone call in response to the decoded signals from the telephone line, wherein the stored data further includes an authorized caller identification, the override circuit being responsive to the origination source being an authorized caller.

2. The ringer control device of claim 1, further including:

a memory containing data representing telephone numbers;

a caller identification circuit couplable to the telephone line; and a comparator coupled to retrieve data from the memory and coupled to the caller identification circuit, the comparator comparing the telephone numbers from the memory to an incoming call telephone number.

3. A telephone for coupling to a telephone line, comprising:
- a ringer;
- a user activated ringer disable circuit coupled to the ringer, the disable circuit being responsive to disable the ringer in response to a user input;
- a remotely accessible activation circuit coupled to the disable circuit and couplable to the telephone line, the activation circuit being responsive to an override signal to override the disable circuit to re-enable the ringer;
- a memory containing a plurality of authorized numbers; and
- a caller identification circuit coupled to the memory and the activation circuit, the caller identification circuit being operative to provide the override signal in response to an incoming caller identification matching one of the authorized numbers.

4. The telephone of claim 3, further including a timer coupled to the disable circuit, wherein the disable circuit is responsive to re-enable the ringer in response to the timer.

5. The telephone of claim 4, further including a programmable integrated circuit device coupled to the disable circuit, the timer and the activation circuit.

6. The telephone of claim 3, further including a housing, wherein the activation circuit and disable circuit are concealed within the housing.

7. The telephone of claim 3, further including a keypad for telephone number dialing coupled to the activation circuit, the activation circuit being responsive to accept user input from the keypad.

* * * * *